April 21, 1964   A. W. ECKSTROM ETAL   3,130,108
ROTATING BLADE TYPE EVAPORATORS Filed Nov. 7, 1960   4 Sheets-Sheet 1

Fig.1.

INVENTORS
Albert W. Eckstrom
James G. Moore
BY Christy, Parmelee
and Strutland
their ATTORNEYS INVENTORS
Albert W. Eckstrom
James G. Moore
their ATTORNEYS

INVENTORS
Albert W. Eckstrom
James G. Moore
BY Christy, Parmelee & Strickland
their ATTORNEYS

United States Patent Office 3,130,108
Patented Apr. 21, 1964

3,130,108
ROTATING BLADE TYPE EVAPORATORS
Albert W. Eckstrom, Snyder, and James G. Moore, Williamsville, N.Y., assignors to Blaw-Knox Company, Pittsburgh, Pa., a corporation of Delaware
Filed Nov. 7, 1960, Ser. No. 67,785
13 Claims. (Cl. 159—6)

This invention relates to evaporators, and is for an improvement in evaporators of the type in which the product undergoing evaporation is spread by rotating blades over the inner surface of an elongated cylindrical or tubular enclosure under controlled conditions of heat and pressure.

Evaporators of the type to which the present invention relates comprise a vertical cylindrical enclosure or shell surrounded by a steam jacket, and within the shell is a rotor having radial vanes that sweep around the interior of the shell in close proximity to the walls of the shell. Liquid material to be concentrated by evaporation is introduced into the top of the enclosure and is spread or distributed over the inner heated walls of the enclosure as a film, and as the product gravitates down the interior walls it is constantly redistributed by the vanes of the rotor. Usually a negative pressure, or pressure below atmospheric pressure is maintained in the enclosure. Product is removed through the bottom of the shell, while vapors are usually removed at the top. This type of evaporator is particularly useful in the removal of water or solvent from viscous or pasty materials, and heat-sensitive substances which are likely to scorch or burn or form encrustations on the wall of kettle or tube type evaporators. The constant redistribution of the material being produced over the hot walls of the shell and the accompanying agitation thereof affords protection against such harmful results, while the spreading of the material into a thin film facilitates the escape of vapor and the effective transfer of heat to the material. Many products which are concentrated in apparatus of this kind are edible substances, such as syrup and edible vegetable pastes, but such apparatus is also used in concentrating organic compounds and chemical substances.

Evaporators of this type heretofore constructed have certain limitations which the present invention overcomes.

Since the rotor revolves at relatively high speed and can only be supported at its ends, it is important that the distance between bearings be kept to a minimum, while at the same time the bearings be outside the tubular enclosure for ready access. It is also important that the bearings be protected from the product, and that the device be constructed so that it can be readily cleaned, and in the case of foods, be kept sanitary and free of food residues. As evaporation of water from a product occurs, the volume of material decreases while its viscosity increases, so that vanes which provide optimum clearance between the walls and the vanes at the top of the evaporator shell may provide too much clearance at the bottom.

A primary object of the present invention is to provide an evaporator of the type referred to of improved construction where the shaft bearings are located outside the evaporator, protected from the product, and readily removable.

A further object of the present invention is to provide an improved arrangement for the removal of finished product and separation of product and vapor while keeping a reduced pressure in the evaporator, and which is designed to reduce the vertical distance between bearings without reducing the available wall area of the tubular chamber.

A further important object is to provide vanes or blades on the rotor arranged to automatically regulate themselves to vary the clearance between the blade edges and the inner surface of the tubular chamber, and also to provide a structure in which control of the thickness of the film on the inner wall of the chamber may be selectively regulated.

These and other objects and advantages are secured by our invention as will more fully appear from the detailed description thereof in conjunction with the accompanying drawings, in which.

Figures 5, 6:
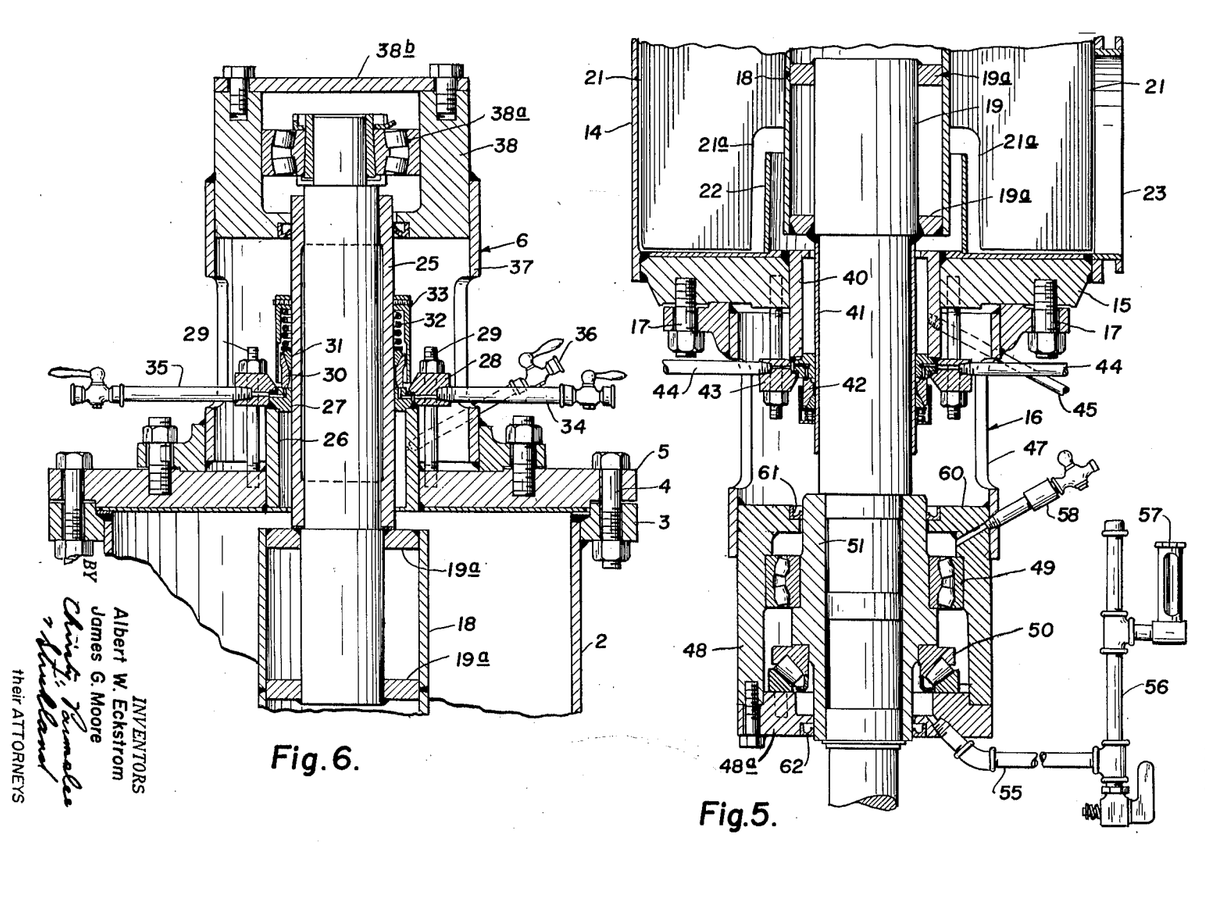
FIG. 5 is a vertical section on a larger scale than FIG. 1 through the lower end of the evaporator and bottom bearing, the separator being omitted.
FIG. 6 is a similar view of the upper end of the evaporator and top bearing assembly.
Figure 7:
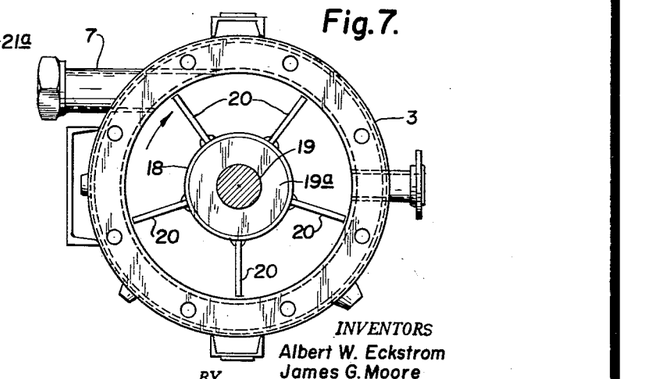
FIG. 7 is a top plan view of the structure surrounding the rotor, showing the product inlet connection.

Referring to the drawings, 2 designates a cylindrical or tubular shell of uniform internal diameter. It is provided with an annular collar 3 about its upper end. As best seen in FIG 6, bolts 4 pass through this collar and through a cover plate 5, and the bolts are provided with nuts whereby the cover plate may be clamped to the top of the shell. As will hereinafter more fully appear, this cover plate has mounted on it the upper bearing for the rotor shaft, this bearing assembly being designated generally as 6. Near the upper end of the shell there is a product inlet pipe 7 through which material to be processed is introduced into the evaporator. It opens tangentially into the interior of the shell, as best seen in FIG. 7.

Below the inlet pipe 7 the casing has an annular collar 8 welded about it, and there is a collar 9 around the lower end of the shell. A concentric cylinder or jacket 10 surrounding the shell has its upper end welded to collar 8 and its lower end welded to collar 9 to form about the shell 2 a steam chamber or jacket which extends throughout the greater portion of the length of the shell 2. There is a steam inlet pipe connection to the chamber near its top, designated 11, and 12 is a nipple near the bottom through which water resulting from condensation of the steam in the jacket may flow to a pipe 13. Other nipples provide for measuring or thermal control instruments. All welding is tight so that pressure may be maintained in the steam jacket sufficient to provide a desired temperature.

The ring or collar 9 at the lower end of the shell has threaded studs depending therefrom, and there is a relatively short tubular extension 14 bolted to this ring, projecting below the steam jacket, and of an internal diameter to constitute in effect a continuation of the shell, and may be considered as a part of the shell 2 which is unjacketed. There is a bottom plate 15 welded into the lower end of the extension 14 (see FIG. 5), and the lower rotor shaft bearing, designated generally as 16, is secured by bolts 17 to the under surface of this plate. The bearing 16 will be hereinafter more fully described. There is provided by this construction an evaporator shell having an upper portion, a lower portion, and an intermediate steam-jacketed portion.

Extending up through the shell from just above the bottom plate 15 to a level just under the cover plate 5 is a tubular rotor core 18. It has at each end an axial shaft extension 19. The lower shaft 19 extends down through a central opening in the bottom plate 15 into and through the lower bearing assembly 16, and the upper shaft extension projects through the cover 5 into the upper bearing assembly 6. Rings 19a on the shaft extension 19, and in the ends of the tubular core 18 welded to these parts rigidly connect the tubular core 18 with the shaft extensions 19.

Figure 3:
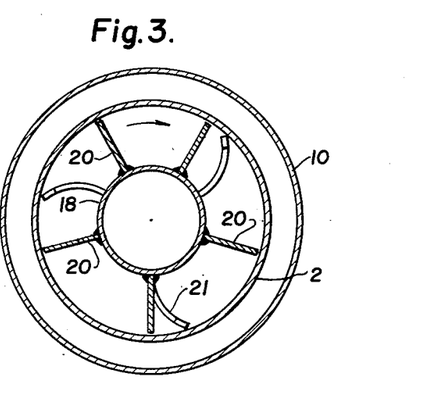
FIG. 3 is a transverse section in the plane of line III—III of FIG. 2 showing the disposition of the vanes, the view, however, showing in section the surrounding shell and steam jacket.
Figure 4:
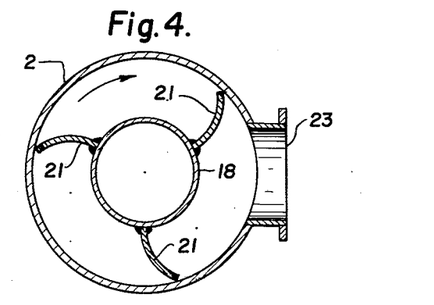
FIG. 4 is a view similar to FIG. 3 in the plane of line IV—IV of FIG. 2 showing the lower end of the tubular shell in section and the product outlet opening.

The core is provided on its outer surface with a series of product-spreading vanes, which, in the form shown in FIGS. 1 to 7, are fixed radial vanes, although the vanes shown in FIGS. 8 to 11, to be hereinafter more fully described, are preferred. However, for simplicity of explanation, the radial vanes will be first described. As best shown in FIG. 3, these vanes 20 may simply comprise metal or other plates rigidly secured to the core 18 of the rotor assembly and projecting radially therefrom. Metal plates are thick enough to be rigid and are welded to the core. They are of a length axially of the structure to extend throughout the entire length of the jacketed surface or intermediate portion of the shell 2, but their lower ends terminate at about the bottom of the steam jacket and their upper ends terminate at about the level of the top of the steam jacket. Radially, they project from the core 18 almost to, but short of the inner wall of the shell 2. They are therefore designed to provide sufficient clearance between the shell and their outer edges to spread and keep a film of the product of generally uniform thickness over the interior of the shell.

On the lower end of the rotatable core within that portion of the jacket provided by the extension 14 below the steam jacket is a series of equally spaced curved vanes 21 (see FIG. 4), preferably different in number from the number of main vanes 20 having their outer edges out of vertical alignment with the main vanes of the rotor. These curved vanes 21, however, preferably extend vertically far enough to project above the bottoms of the main vanes. These vanes have a working clearance with the inner walls of the shell extension 14 and with the bottom plate 15. However, where there is a skirt 22 extending upwardly from the level of the plate 15 as shown in FIG. 5, the vanes 21 are notched away at 21a to clear this skirt. The purpose of the skirt is to keep material being processed away from the shaft 19 where it passes through the plate 15. The shell extension 14 has an opening 23 through its side wall, the bottom of which is flush with the level of the bottom plate 15, and the top of which is well above said bottom plate, but below the steam jacket. This opening is large enough to provide for the removal of both the concentrated material and the vapors without any appreciable pressure drop through the opening. The vanes 21 constitute a centrifugal pump for expelling the material or product which has been evaporated, and also vapor through the opening. This arrangement enables the product to be removed without requiring the usual conical extension at the bottom with a small outlet for product and additional height above the rotor for the removal of vapors, and thereby contributes importantly to the reduction in the necessary length of the rotor between bearings. By having the vanes 21 curved with the convex surface at the front with regard to the direction of rotation of the rotor, centrifugal force is most effective to discharge the concentrated material and prevent any accumulation of the material in the bottom of the evaporator. This is particularly important in the case of viscous product and vegetable paste which does not readily flow by gravity. The port 23 leads into an outlet connection or duct 24 of equally large diameter, and as will be hereinafter explained, the duct leads to means for creating a partial vacuum in the evaporator. The blades 21 extend up past the lower ends of the main rotor vanes in order that there will be no area of the wall of the evaporator below the main vanes and the vanes 21 where material may collect or stagnate. From this it might be expected that the main vanes could be extended downwardly to accomplish the function of blades 21. Aside from the fact that such extension of the main vanes would render it difficult to provide the required curvature for the vanes, such complete extension of the main vanes would tend to create a valve-like action as these vanes moved past the outlet opening, such that suction in outlet passage 24 could only be communicated progressively to the spaces between the main vanes and not uniformly through the interior of the shell. By having separate pump vanes 21 staggered with reference to the main vanes, and fewer in number, the continuity of the vapor path from between any two main vanes and the outlet is never interrupted, and the pump cannot act as a valve or revolving gate to allow vapor to flow progressively only from the spaces between one or two main vanes at a time.

Unexpectedly, this arrangement of product expelling blades 21 relative to main vanes 20 acts as a "foam-breaker" so that far less material leaves the evaporator as foam. The construction described therefore not only allows the distance between shaft bearings to be held to a minimum consistent with the square feet of heat exchange area in the evaporator, but provides for the effective removal of non-flowable or highly viscous material. Also it enables all spaces between the main vanes to at all times be in direct communication with suction in outlet connection 24, while unexpectedly reducing foam from the concentrated product.

The upper end of the shaft is surrounded by a bearing sleeve 25 keyed thereto for rotation therewith. The cover plate 5 has a central opening therethrough and a fixed tubular casing 26 is welded into this opening and projects outwardly or upwardly from the plate 5. A bearing and sealing ring 27 surrounding the sleeve 25 is clamped to the top of the casing 26 by a clamping ring 28 held down by stud bolts 29 extending up from the plate 5 and passing through the ring 28 with nuts at the top to hold the ring down. Above the ring 28 there is a sealing ring 30 with a cooperating wedge ring or mechanical seal 31 held in the ring 30 by a spring 32 in a retainer 33 fixed on the sleeve 25. This type of mechanical seal to replace a packing gland is now known to the art. There are oil nipples with cocks 34 and 35 located on the hold-down ring 28 for circulating oil through the mechanical seal provided by the ring 27, ring 30 and wedge 31. There are also inclined tubes 36, preferably 180° apart, with cocks therein, and which are on the tubular casing 26 and pass therethrough for introducing washing liquid around the shaft and sleeve below the mechanical seal. The upper bearing assembly allows for any relative expansion or contraction of the rotor assembly through the sleeve 25 being slidable in the barrier retainer 38 and the cavity in the container 38 allowing the bearing 38a to move up or down therein.

Bolted to the cover plate 5 around the mechanical seal is a bearing housing 37 to the top of which is secured a bearing retainer 38 in which is a roller bearing 38a about the end of the upper shaft 19 constituting the radial bearing for the upper end of the rotor assembly. A cap plate 38b closes the retainer 38.

The lower bearing 16 (see FIG. 5) for the rotor is somewhat more elaborate than the upper bearing, since the rotor is driven through a pulley and belt at the lower end of shaft 19, and this bearing must take both the vertical thrust and the radial forces at the bottom of the shaft. Within the diameter of the skirt 22, the bottom plate 15 has a central opening from which depends a tubular casing or skirt 40 corresponding to casing or skirt 26 of the top bearing assembly. The shaft has a sleeve 41 fitted thereabout that extends from the lower end of the rotor down through the skirt 40. There is a mechanical seal about the shaft and sleeve designated generally as 42, and since this seal is substantially an inverted counterpart of the mechanical seal at the top, it need not be described in detail. Mechanical seals of this type are already known, and the seal per se is no part of this invention. There is a clamping or hold-down ring 43 supported at the end of skirt 40 and held in place by stud bolts and nuts similar to the hold-down ring 28 of the upper bearing assembly. Nipples 44 corresponding to 34 and 35 provide for the circulation of oil to the mechanical seal. There may be one or more tubes 45 arranged similarly to the tubes 36 mounted on the skirt 40 and opening through the skirt for washing or flushing material out of the mechanical seal and from around the shaft immediately above it.

Figure 1:
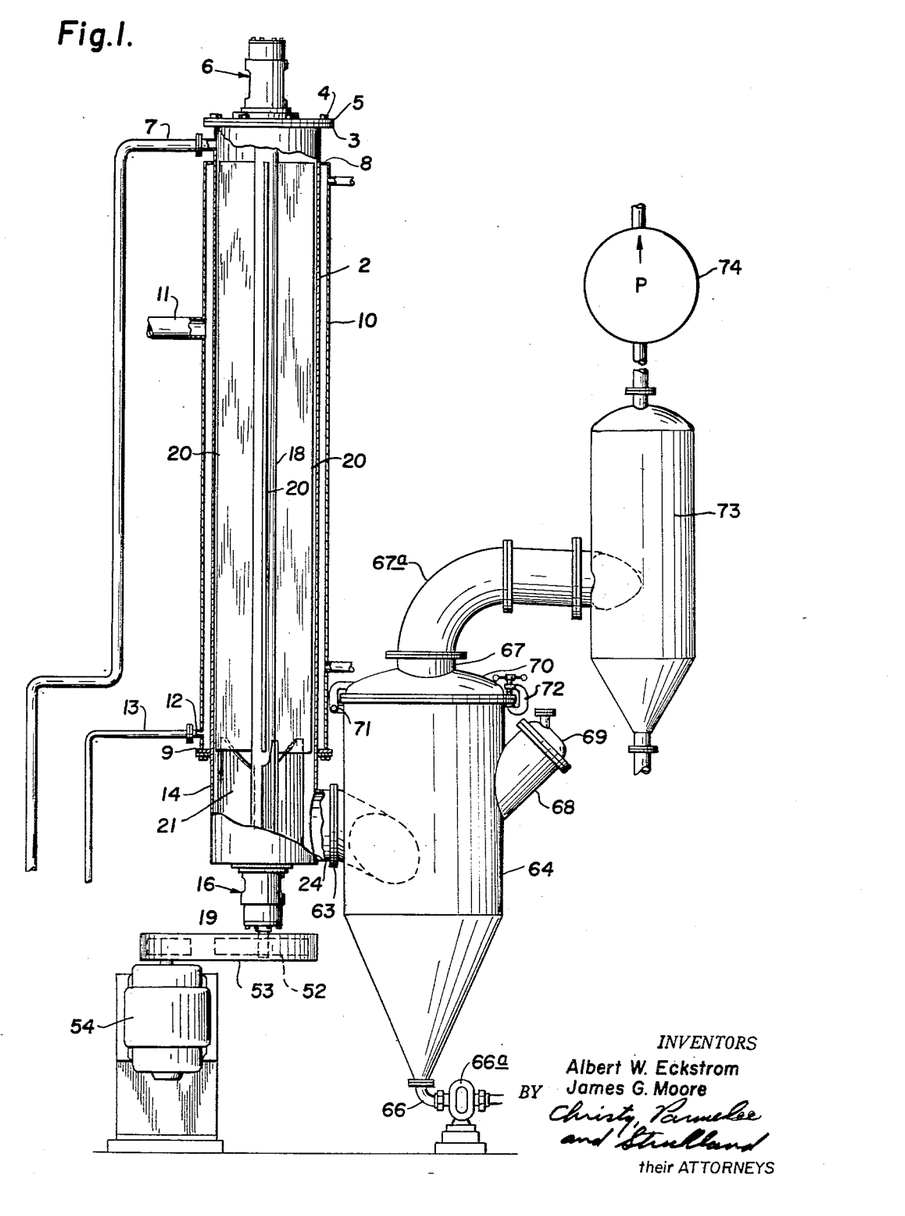
FIG. 1 is a general view, partly in side elevation and partly in section, of an evaporator embodying our invention, details of construction not important to the invention not being shown.
Figure 2:
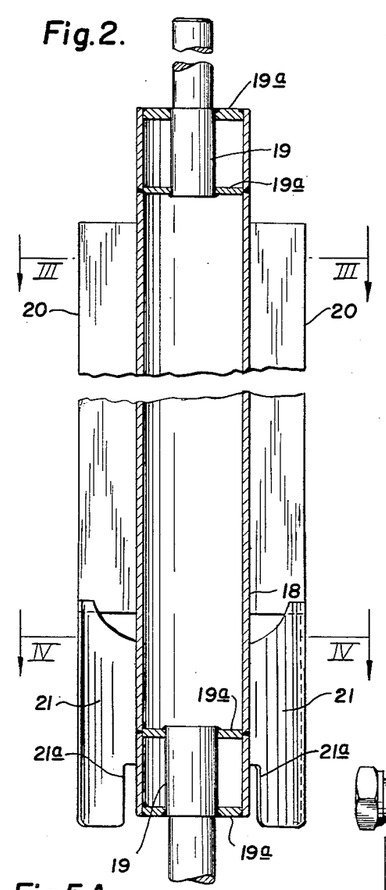
FIG. 2 is a vertical section through the rotor assembly removed from the apparatus.

There is a bearing housing 47 bolted to the bottom plate 15 and depending concentrically about the shaft 19. At its lower end it has a bearing retainer 48 at the bottom of which is a cover plate 48a through which the lower shaft 19 passes. This encloses the mechanical seal above described, and the retainer contains radial bearing 49, and on the bottom plate 48 a thrust bearing 50. The thrust bearing 50 is a cone bearing designed to transmit the downward thrust of the rotor into the bearing housing. The lower shaft 19 is provided with a bearing sleeve 51 which is secured thereto for rotation therewith, and which cooperates with the bearings 49 and 50. The lower end of the shaft 19 is of reduced diameter, and is designed to carry a pulley not shown in FIG. 5, but which is indicated in FIG. 1, the pulley being designated 52. This pulley is engaged by belts 53 which pass around a drive pulley on a driving motor 54 positioned beneath and to one side of the unit.

Provision is made for introducing oil into the housing around the bearings, this being provided by a pipe 55 leading through the bottom plate 48 into the area around the shaft immediately below the bearing 50, there being a stand pipe 56 connected with the pipe 55 for maintaining a predetermined level of oil in the bearing, and a sight glass 57 indicating the level of oil in the bearing. There is a second nipple 58 above the bearing 49, and which has a cock at the outer end, and through which oil may be introduced into the space around the shift above the bearing 49. Above the bearing 49 there is a cover plate 60 for confining the oil around the bearing, the cover plate having an oil sealing ring 61 where the sleeve 51 passes through it. There is also an oil seal 62 in the bottom plate 48 where the sleeve 51 passes through said plate.

Figure 5A:
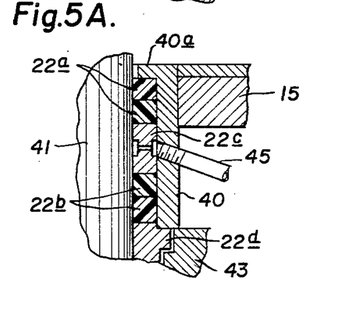
FIG. 5A is a fragmentary vertical section through a modified form of packing for the lower end of the rotor shaft.

In some cases, particularly for the processing of edible pastes, it may be desirable to eliminate the skirt 22 from around the lower end of the rotor, and to use a packed bearing in the space between the depending skirt 40 and the sleeve 41 around the lower shaft 19. This is illustrated in FIG. 5A, in which corresponding reference numerals designate corresponding parts. The bottom plate 15 in this case does not have the upstanding skirt 22. In the space between the depending skirt 40 and the sleeve 41 there are a series of preformed packing rings designated 22a and 22b. These packing rings are preferably formed of plastic material such as a tetrafluorenethylene resin sold under the name "Teflon." Between the rings 22a and the rings 22b there is a lantern ring 22c, this lantern ring being preferably of bronze or other bearing metal having a close fit about the sleeve 41. It is an I-section with openings passing through the middle web portion from the outside to the inside. The rings 22b are located below the lantern ring and are retained in place by a bottom ring 22d which may be held in place in the same manner as the stationary ring of the mechanical seal shown in FIG. 5; that is, by a supporting ring 43 retained in place by stud bolts extending up into the bottom plate 15.

The pipes 45 terminate at the outer channel of the lantern ring 22c. Water may be supplied through the pipes 45 as a lubricant, and it flows through the openings in the web of the lantern ring to also provide lubricant between the sleeve 41 and the lantern ring and in the space in which the rings 22a and 22b are contained, and keeps any deposit of food materials from forming in the packing or immediately above the packing. The skirt 40 has an inwardly-turned flange 40a that retains the packing elements 22a, the lantern ring, and the rings 22b from any upward movement. The form of packing could also be used in conjunction with the skirt 22, should it be desirable in any case to do so.

From the foregoing description it will be seen that the product is introduced into the top of the cylindrical seal through the pipe 7, and only one outlet port from the shell is provided by the opening 23 in the extension 14 at the bottom of the shell. This is because the product which has been processed and the vapors which the product had yielded are both removed at the bottom of the unit through this port 23. The duct 24 surrounding the opening 23 and leading therefrom is connected at 63 with a downwardly-inclined extension of the duct that extends downwardly and tangentially into a cyclone type separator 64. This separator has a conical bottom portion leading to a discharge pipe 66 in which there may be a pump 66a. It has an exhaust duct 67 leading out the top or cover thereof to a condenser 73, and thence to a vacuum pump 74 as schematically illustrated whereby a negative or sub-atmospheric pressure is maintained in the separator, and through the separator an orifice 23, in the interior of the vapor shell. The separator 64 has an inclined tubular extension 68 extending upwardly at the side thereof into which is secured a removable cover 69 in which is a glass window. This cover may be readily removed, as by unbolting it to give access to the interior of the separator for inspection and for cleaning it. In large diameter separators the cover 69 may be large enough to enable a man to enter the interior of the separator through the extension 68 when cover 69 is removed. Cleaning is important in equipment of this kind particularly where food products or corrosive chemicals or air-hardening products may be processed. Also, particularly on smaller separators, the cover 70 is hinged to the top of the separator at 71 and a clamp at 72 opposite the hinge engages a projecting lug on the cover. There is a coupling 67a in duct 67, so that, upon release of the clamp, the cover may be opened to afford access to the entire interior of the separator and the under surface of the cover.

In the construction as described, any liquid which can be pumped can be processed. The rotor is driven at a relatively high speed. As an example, the length of the shell along which the steam jacket extends may be four feet, and the diameter is of the order of about twenty-two inches, while the rotor may be rotated at such rate that the peripheral speed of the vanes at the tip is about thirty feet per second. The height and diameter will vary, however, according to the area of heated surface required, and the speed of the rotor depends upon the material being processed, ranging usually between a peripheral speed of 28 to 45 feet per second. As the product flows into the top of the evaporator shell, it is engaged by the vanes and spread around the interior walls of the evaporator. The thickness of the film depends on the clearance between the ends of the vanes and the inner wall of the evaporator, and will also depend somewhat on the viscosity of the material being processed. The operation is effected in such a manner that a surplus of material is carried about the interior of the evaporator in front of each vane, the material constituting this surplus being constantly agitated by the addition of new material and the scraping away of previously spread material. With viscous cohesive material such as corn syrup, the film may be drawn even thinner than the clearance space between the edges of the vanes and the inner wall of the evaporator. As the material is spread around in the evaporator, the evaporator shell of course is maintained at an elevated temperature and the thin film of material is quickly heated. The constant movement of the vanes keeps this film in a state of agitation so that there is no burn-on or encrustation.

Important with the present invention is the construction wherein the main vanes terminate at about the level of the steam jacket, with the provision of the curved impeller vanes to force the material laterally through the discharge opening as explained above.

Also with the structure as above described, either the top or bottom bearings can be completely removed for servicing, repair, or replacement without disturbing the body of the evaporator, and the bearings are located remote from the flow of product. At the same time the overall length of the device is shortened, first by reason of the fact that there is no vapor chamber required at the upper end of the evaporator, since the vapors and product are both withdrawn from the sides of the extension 14 at the lower end of the unit, and secondly because the product is pumped or expelled through the side opening with the product being collected in a separator at the side of the evaporator instead of having the product collected in a collector immediately under the evaporator, as is usual. Because of the product being expelled through the side of the evaporator, the seal and bottom bearing are directly below the plate 15 and the discharge opening is large enough so that vapors and product may be expelled with no appreciable pressure drop between the evaporator and the separator. Materials which are too thick or viscous to flow by gravity through a bottom discharge pipe are readily processed in this apparatus.

While the construction above described performs in a commercially satisfactory way, we have discovered that unexpectedly the output of the unit can be very substantially increased, or the rate of evaporation increased, as provided by test runs if the rotor construction is modified in the manner disclosed in FIGS. 8 to 11.

Figure 8:
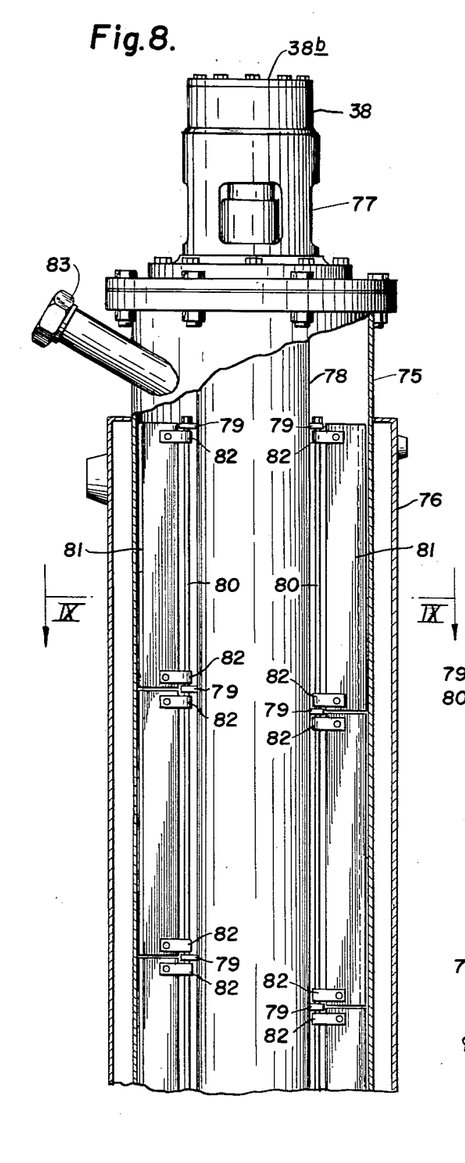
FIG. 8 is a fragmentary view partly in elevation and partly in vertical section similar to FIG. 1 with a modified rotor construction.
Figure 9:
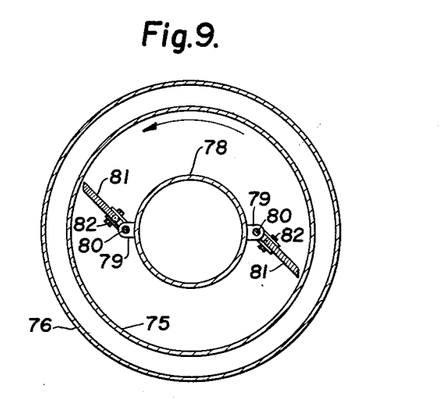
FIG. 9 is a transverse vertical section in the plane of line IX—IX of FIG. 8.

In the construction shown in FIGS. 8 and 9, there is a cylindrical evaporator shell 75, similar to that previously described, with a steam jacket 76 thereabout. A top bearing 77, similar to 6 above described, is provided, and the lower end of the casing and lower bearing are the same as in FIGS. 1 to 7, using either the arrangement of FIG. 5 or FIG. 5A, all parts of the entire apparatus in fact being the same as previously described, except the vanes of the rotor. The rotor, the lower end of which is not shown, but which is provided with impeller or curved vanes as in FIG. 1, has a tubular core 78. Within the extent of the steam-jacketed length of the shell it is provided with vanes, but the vanes, instead of being rigidly attached to the rotor, are pivotally secured thereto. In FIGS. 8 and 9 we have shown but two vanes. There may, however, be any number equidistantly spaced around the core. In addition to being pivotally secured to the core, the vanes are also preferably sectional, comprising a series of relatively short sections.

Figure 10:
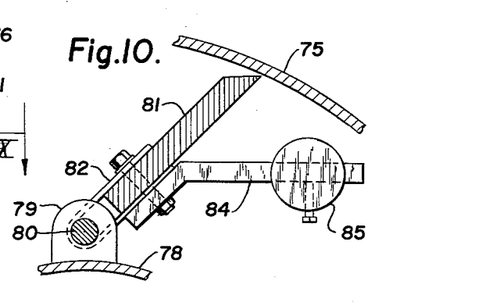
FIG. 10 is an enlarged fragmentary detail of still another form of rotor blade.
Figure 11:
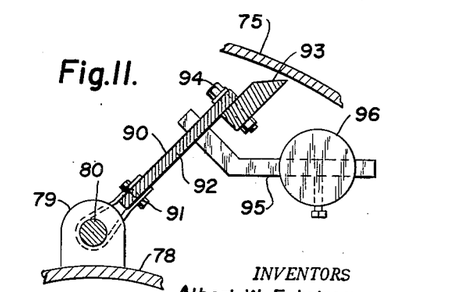
FIG. 11 is a view similar to FIG. 10 of a slightly different form of blade.

In FIGS. 8 and 9 the core 78 is provided at intervals along its length with aligned lugs 79 in which are aligned openings so that a straight hinge pin may be passed therethrough lengthwise of the core. These hinge pins are designated 80. The vanes, as above indicated, are each comprised of relatively short sections in end-to-end relation. They may comprise a strip 81 of metal or plastic or composition material compatible with the product being processed, of a thickness sufficient to be rigid for the use to which they are put. As best seen in FIGS. 10 and 11, each vane section has at least two hinge loops at its inner edge formed by a U-shaped strip of metal 82. An open strap hinge of this character is preferred because it may be easily cleaned. The hinge pin 80 passes through the hinge loops 82 of all of the sections which constitute a single composite vane or vane assembly. The outer edges of each vane section are in most cases beveled as shown, and as indicated by the arrow in FIG. 9 showing the direction of rotation of the rotor, the vane sections, instead of being radial, are inclined outwardly from the hinge away from the direction of rotation; that is, these outer beveled edges trail the hinge pins to which they are attached and by which they are carried around with the rotor. The vane sections are therefore wide enough in a radial direction to extend from the hinge to, and bear against, the inner surface of the shell 75. It is to be noted that in FIGS. 8 to 12 the direction of rotation of the rotor, as indicated by the arrows, is opposite to that shown in FIGS. 3, 4 and 5. This is a matter of choice.

As will be observed in FIG. 8, the lugs 79 for the hinge pins for one composite vane are out of peripheral alignment, the two upper vane sections for one vane assembly being longer than the corresponding ones of the other vane assembly, with the two lower sections of the second-named assembly being longer (assuming each assembly to have four sections) than the lower two sections of the first. This results in the joints between confronting sections of one assembly being "broken" or staggered or out of peripheral alignment with the joints between adjacent sections of another or the other. This is important in preventing any ridge or accumulation of product to develop on the inside of the shell, as it might do if the joints between sections were not staggered.

In operation, product is introduced into the top of the evaporator through pipe 83, the same as in the form shown in FIG. 1, except, because of the opposite direction of rotation of the rotor, the inlet 83 is oppositely directed. Centrifugal force, acting on the vanes, urges the edges of the vanes toward the walls of the evaporator. This force is resisted by the product, which is thereby spread into a film, the thickness of which is determined by the physical properties, consistency or viscosity of the product, and by the centrifugal force acting on the vane. With a viscous, sticky material such as corn syrup, the film may be attenuated or thinned by the pulling of the vane away from it as the vane moves around the evaporator. As the product loses water, its volume decreases, while its viscosity may increase. As its temperature increases, its viscosity may decrease. For these reasons, uniform spacing between the edge of the vane and the inner wall of the evaporator from top to bottom is not as effective as with the sectional vane assembly here shown where each section may adjust itself to the forces acting upon it. The vanes so formed also provide flexibility to compensate for variations in camber of the shell as well as to automatically adjust themselves to the material being processed. Laboratory tests run on different products prove that there is a definite increase in the rate of heat transfer per square foot of evaporator area where such swinging blades are used. Using the same concentration of gum arabic solution with fixed and swinging blades, the average rate of heat transfer was increased from 178 B.t.u. per square foot per hour to 275 B.t.u. Corn syrup of 3% Brix was concentrated in a single pass to 47% Brix, or a volume reduction of about 18.8 to 1, using swinging blades, whereas with fixed blades a concentration 6–7 to 1 was the best obtainable reduction where fixed blades were employed. There is a substantial increase in the rate of heat transfer or ratio of volume reduction in a given unit of time using swinging blades.

In some cases, it may be desirable on some or all sections of the vanes to controllably regulate the effect of centrifugal force. This may be accomplished by adding weights on the vane sections. One way of doing this is shown in FIG. 10 where the vane is the same as shown in FIG. 9 and corresponding reference numerals have been used to identify corresponding parts. Here the hinged vane section 81 is provided on its rear or trailing surface with a fixed laterally-offset arm 84 on which is an adjustable weight 85. The effect of centrifugal force is increased by this weight, and the further it is located from the vane, the greater will be the force which it exerts in urging the edge of the vane outwardly. In any case, in all forms of the device, the vanes must be stiff or rigid to effect a constant spreading of the material and carry a roll of the material ahead of the blade and scrape the material way, as well as spread it.

FIG. 11 shows a slight modification of the vane section. In this view, as in FIGS. 9 and 10, 78 is the rotor core, and 79 the lugs for the hinge rod 80. The vane section is here designated 90 and is hinged by a strap loop 91 as in FIGS. 9 and 10. Instead of the vane section being a unitary strip, it comprises a main plate or vane member 92 to the outer edge of which is removably secured a scraping blade 93 that is beveled, as described in FIG. 9. It is attached to the main vane section 92 by bolts and nuts 94. The main section may be metal and the blade plastic, or the member 92 could be resinous material reinforced with fiberglass, and the blade of some other composition, or both the body and vane could be of the same material. An angular arm 95 extending rearwardly and outwardly from the rear face of the blade is provided with an adjustable weight 96, this being for the same purpose as the arm 84 and weight 85 in FIG. 10. Also, the assembled vane section construction shown in FIG. 11, with its separate blade could be used with the swinging vane of FIG. 10 or the fixed vane arrangement in FIGS. 1 to 7. It will be further understood that the blade structure shown fragmentarily in FIGS. 10 and 11 is intended to be used with the evaporator of FIGS. 1 to 7 i.e., the only difference being in the rotor and vane arrangement. The rotor in each case of course has the short separate impeller or centrifugal pump structure at the bottom.

In one operation utilizing the structure shown in FIG. 1, corn syrup previously concentrated to 75 to 81% solids is fed into the top of the evaporator shell. As it flows down the wall it is spread out into a film which is continuously agitated and spread about and redistributed by the rapidly revolving rotor vanes, and the outer edges of which are moving at a speed of about 30 feet per second. The clearance between the vanes and the inner wall of the shell 2 is of the order of 0.31 inch, the actual film behind the blade being somewhat thinner because of its being pulled by the vane, while a small roll of accumulated product is carried in front of the vane, with the material in the roll undergoing constant change. The wall of the shell is heated by steam at about 300° F. and a vacuum of about 10 inches of mercury is maintained inside the shell. The water from the product is progressively evaporated and the product concentrated as it moves down the interior wall of the shell. It is dried to a moisture content of between 2% and 4% in some 10 to 15 seconds. In the present example the length of the evaporator section was about four feet with an internal diameter of about 22 inches.

The liquid draining into the extension 14 consists of molten corn sugar at a temperature of about 240°-280° F. It is quite viscous, and heating ceases when it enters this section to avoid discoloration. The impeller comprising the curved vanes 21 expels this product with considerable velocity through the port 23 and also expels the steam or vapor removed from the product with negligible pressure drop through the opening. The hot product, entering the separator, is passed to a cooling type flaker (not shown) where it forms thin white flakes of corn sugar.

It will of course be understood that the foregoing is a typical example, and that it may be used for evaporating various substances. Also, while we have specially described a preferred construction embodying our invention, various changes and modifications may be made in the construction within the contemplation of our invention.

We claim:

1. A rotating blade type evaporator comprising a vertically-disposed elongated evaporator shell of circular section throughout its length having an upper portion, a lower portion, and an intermediate portion forming a continuous smooth interior wall, means for heating the walls of the intermediate portion only, means for delivering material to be concentrated by evaporation into the upper portion, a rotor extending longitudinally of the shell having main vanes thereon for spreading material over the interior of the shell and agitating the same, the vanes extending from the upper portion to the lower end of the intermediate portion, a bottom cover plate closing the end of said lower portion, the lower portion of the shell having an open area therein extending upwardly from the bottom cover plate through which both liquid and vapor are discharged from the evaporator in the side wall thereof, an impeller on the lower end of the rotor within said lower portion of the shell having other vertical centrifugally acting vanes separated from and out of vertical alignment with the main vanes for expelling product and vapors peripherally through said open area, a separator having a duct leading from the opening to the interior thereof, means communicating through the separator to the opening for maintaining a partial vacuum within the shell, said other vertical vanes in the lower portion acting to forcibly expel the vapors through said open area and overcome back pressure in the open discharge area and at the same time to break foam formed during evaporation of vapors from the liquid in the heated intermediate area of the shell and release vapors from such foam before the material is discharged into the separator, the rotor having a shaft extension at the bottom passing through the bottom cover plate, means extending downwardly from said cover plate providing a sealed bearing about said shaft extension, the shell having a top cover plate, a shaft extension at the top of the rotor extending upwardly through the top cover plate, means on the exterior of the top cover plate providing a sealed bearing for the upper shaft extension, and driving means on one of said shaft extensions.

2. A rotating blade type of evaporator comprising a vertical cylindrical evaporator shell having a steam jacket thereabout, the upper end of the shell extending above the steam jacket and having an inlet opening therein for the introduction of liquid material to be evaporated, a cylindrical extension at the bottom of the shell immediately below the steam jacket, said extension having a common product and vapor outlet opening in the side wall thereof, a cover plate at the top of the shell, a cover plate at the bottom of said extension, a rotor concentrically positioned within the shell extending from the bottom plate to the cover plate, the rotor having vanes for spreading liquid material to be evaporated on the periphery thereof throughout the length of the portion of the shell surrounded by the steam jacket, the outer edges of the vanes terminating adjacent the interior of the shell, the rotor within the extension having a series of vertical, centrifugally acting impeller vanes thereon at its lower end within said extension separate from and out of alignment with said first named vanes for removing the evaporated product and vapors centrifugally through said outlet opening, the rotor having shaft extensions at each end passing through the respective cover plates, and shaft bearing and sealing assemblies removably mounted on the exterior of the cover plates about the respective shaft extensions.

3. A rotating blade type evaporator as defined in claim 2 wherein the product outlet opening extends upwardly from the level of the top surface of the bottom cover plate, the top edges of the impeller vanes being out of vertical alignment with the first-named vanes and being curved to present a convex surface to the product to be expelled in relation to the direction of rotation of the rotor and having their bottom edges at substantially the level of the bottom cover plate for removing material from the bottom cover plate through said outlet opening, and a vacuum separator system connected with the outlet opening for receiving the evaporated product and through said opening and maintaining a sub-atmospheric pressure in the evaporator.

4. A rotating blade type evaporator as defined in claim 2 wherein the product outlet opening extends upwardly from the level of the top surface of the bottom cover plate, the top edges of the impeller vanes terminating near the top of said extension at the bottom of the shell but above the lower ends of the first-named vanes and having their outer edges out of vertical alignment with the outer edges of the product-spreading vanes, the impeller vanes having their bottom edges at substantially the level of the bottom cover plate for removing material from the bottom cover plate through said outlet opening, and a vacuum separator system connected with the outlet opening for receiving the evaporated product and vapors through said opening and maintaining a sub-atomspheric pressure in the evaporator.

5. A rotating blade type evaporator as defined in claim 2 wherein the product outlet opening extends upwardly from the level of the top surface of the bottom cover plate, the top edges of the impeller vanes terminating near the top of said extension at the bottom of the shell but above the lower ends of the first-named vanes and having their outer edges out of vertical alignment with the outer edges of the product-spreading vanes, the impeller vanes having their bottom edges at substantially the level of the bottom cover plate for removing material from the bottom cover plate through said outlet opening, and a vacuum separator system connected with the outlet opening for receiving the evaporated product and vapors through said opening and maintaining a sub-atmospheric pressure in the evaporator, the bottom plate having a central opening through which the rotor shaft extension passes, a cylindrical skirt surrounding said central opening and projecting upwardly into the shell extension about the lower end of the rotor, the impeller blades being attached to the rotor above the skirt and extending downwardly around the skirt, the skirt serving to keep product away from the shaft extension at the bottom of the rotor.

6. A rotating blade type evaporator as defined in claim 2 in which the top and bottom cover plates each have an opening therethrough through which the shaft extensions pass, an outwardly-extending skirt sealed about each opening, said sealing and bearing assemblies comprising a mechanical seal about each shaft extension supported against and removably secured on the outer edge of each such skirt, a bearing housing removably secured to the exterior of each cover plate enclosing the mechanical seal, each bearing housing containing shaft bearings located outwardly from the seal for the respective shaft extensions.

7. A rotating blade type evaporator as defined in claim 2 in which the top and bottom cover plates each have an opening therethrough through which the shaft extensions pass, an outwardly-extending skirt sealed about each opening, said sealing and bearing assemblies comprising a mechanical seal about each shaft extension supported against and removably secured on the outer edge of each such skirt, a bearing housing removably secured to the exterior of each cover plate enclosing the mechanical seal, each bearing housing containing shaft bearings located outwardly from the seal for the respective shaft extensions, the shaft extension at the bottom of the evaporator projecting below the bearing housing with driving means on the portion of the shaft which so projects, the bearings in the bearing housing at the bottom being both thrust and radial bearings.

8. A rotating blade type evaporator as defined in claim 2 in which the top and bottom cover plates each have an opening therethrough through which the shaft extensions pass, an outwardly-extending skirt sealed about each opening, said sealing and bearing assemblies comprising a seal about each shaft extension supported by such skirt, a bearing housing removably secured to the exterior of each cover plate enclosing the mechanical seal, each bearing housing containing shaft bearings located outwardly from the seal for the respective shaft extensions, the shaft extension at the bottom of the evaporator projecting below the bearing housing with driving means on the portion of the shaft which so projects, the bearings in the bearing housing at the bottom being both thrust and radial bearings, and pipe connections passing through the bearing housings into the respective skirts for introducing water into the space around the shaft within each skirt for flushing product from around the shaft within the skirt.

9. A rotating blade type of evaporator comprising a vertical cylindrical evaporator shell having a steam jacket thereabout, the upper end of the shell extending above the steam jacket and having an inlet opening therein and for the introduction of material to be evaporated, an extension at the bottom of the shell immediately below the steam jacket, said extension having a product and vapor outlet opening in the side wall thereof, a cover plate at the top of the shell, a cover plate at the bottom of said extension, a tubular cylindrical rotor concentrically positioned within the shell extending from the bottom plate to the cover plate, the rotor being entirely closed against the circulation of liquid or vapor therethrough, the rotor having vanes for spreading material being subject to evaporation on the periphery thereof throughout the length of the portion of the shell surrounded by the steam jacket, the outer edges of the vanes terminating adjacent the interior of the shell, the rotor within the extension having a series of separate impeller vanes thereon at its lower end within said extension out of alignment with the material-spreading vanes for removing the evaporated product through said outlet opening, the rotor having shaft extensions at each end passing through the respective cover plates, and shaft bearing and sealing assemblies removably mounted on the cover plates about the respective shaft extensions, the material-spreading vanes of the rotor being connected with the rotor through hinges whereby they may swing outwardly toward the interior of the shell under centrifugal force, the impeller vanes being fixed on the rotor.

10. A rotating blade type of evaporator comprising a vertical cylindrical evaporator shell having a steam jacket thereabout, the upper end of the shell extending above the steam jacket and having an inlet opening therein for introducing a liquid to be subjected to evaporation, an extension at the bottom of the shell immediately below the steam jacket, said extension having a product and vapor outlet opening in the side wall thereof, a cover plate at the top of the shell, a cover plate at the bottom of said extension, a cylindrical tubular rotor closed against the circulation of the liquid and vapors therethrough concentrically positioned within the shell extending from the bottom cover plate to the top cover plate, the rotor having material-spreading vanes on the periphery thereof throughout the length of the portion of the shell surrounded by the steam jacket, the outer edges of the vanes terminating adjacent the interior of the shell, the portion of the rotor within the extension having a series of separate impeller vanes thereon at its lower end for removing the evaporated product through said outlet opening, the rotor having shaft extensions at each end passing through the respective cover plates, and shaft bearing and sealing assemblies removably mounted on the cover plates about the respective shaft extensions, the material-spreading vanes comprising separate sections in end-to-end relation, each section being independently movable toward and away from the inner wall of the shell relative to the other sections of the same vane, the sections of one vane having the separation between sections staggered with reference to those of another vane whereby the combined sectional vanes provide an unbroken spreading action along the full extent of the vanes, the impeller vanes being fixed on the rotor against movement and being out of alignment with the material-spreading vanes and having their upper ends extending past the lower ends of the material-spreading vanes.

11. A rotary vane type evaporator comprising a cylindrical evaporator shell having its longitudinal axis disposed in a vertical position, the shell having a product and vapor discharge opening at the bottom thereof in the side wall thereof and having a passage at the top for the introduction of material to be evaporated, means for heating the shell between the top and said side wall opening at the bottom, a rotor located concentrically within the shell, said rotor having a central core, means externally of the shell for driving the rotor in one direction, vanes on the rotor extending lengthwise of the core within that portion of the shell only which is provided with heating means, said vanes being attached to the core for movement outwardly from the center of rotation under centrifugal force, the vanes comprising a succession of separate rigid sections in end-to-end relation, each section being movable under centrifugal force independently of the other sections of the same vane, and separate radially-extending foam-breaking and product-expelling blades in vertical planes angularly spaced and immovably fixed on the lower end of the rotor out of line with said first vanes for expelling product through the product and vapor discharge opening.

12. A rotary vane type evaporator comprising a cylindrical evaporator shell having its longitudinal axis disposed in a vertical position, the shell having a product and vapor discharge opening at the bottom and having an inlet passage at the top for the introduction of material to be subject to evaporation, means for heating the shell between the top and bottom, a rotor located concentrically within the shell, said rotor having a central core, means externally of the shell for driving the rotor in one direction, and vanes on the rotor extending lengthwise of the core within that portion of the shell only which is provided with heating means, said vanes being attached to the core for movement outwardly from the center of rotation under centrifugal force, the vanes comprising a succession of separate rigid sections in end-to-end relation, each section being movable under centrifugal force independently of the other sections of the same vane, the level of separation of the vane sections of one vane being staggered with respect to the level of separation of sections of another vane.

13. A rotor for use in an evaporator of the class described having a central core with shaft extensions at each end, the core being hollow and of a diameter greater than the diameter of the shaft extensions, the core having at equal distances around its periphery a series of aligned lugs, a single hinge pin passing through each series of aligned lugs, rigid vane elements each having a plurality of looped hinge straps along their inner edges, said hinge pins passing through the looped hinge straps of a single vane element whereby the vane element may hinge about the respective pins relative to the core, said loops providing a hinge structure from which accumulated product may be flushed.

References Cited in the file of this patent

UNITED STATES PATENTS

| | | |
|---|---|---|
| 1,672,218 | How | June 5, 1928 |
| 2,460,602 | Semon | Feb. 1 1949 |
| 2,546,381 | Zahm | Mar. 27, 1951 |
| 2,570,211 | Cross | Oct. 9 1951 |
| 2,672,926 | Cross | Mar. 23, 1954 |
| 2,774,415 | Belcher | Dec. 18, 1956 |
| 2,868,279 | Bechtler | Jan. 13, 1959 |
| 2,955,990 | Smith | Oct. 11, 1960 |
| 2,974,725 | Samesreuther et al. | Mar. 14, 1961 |

FOREIGN PATENTS

| | | |
|---|---|---|
| 740,825 | Great Britain | Nov. 23, 1955 |
| 1,061,293 | Germany | July 16, 1959 |